July 8, 1952

C. F. ZIMMERMAN ET AL 2,602,612

AIRCRAFT LANDING WHEEL ASSEMBLY

Filed Aug. 17, 1948

INVENTORS.
CHARLES F. ZIMMERMAN
ROBERT E. KIBELE

BY

Richard W. Treverton

ATTORNEY.

Patented July 8, 1952

2,602,612

UNITED STATES PATENT OFFICE 2,602,612

AIRCRAFT LANDING WHEEL ASSEMBLY

Charles F. Zimmerman, Westerville, and Robert E. Kibele, Columbus, Ohio, assignors to Curtiss-Wright Corporation, a corporation of Delaware Application August 17, 1948, Serial No. 44,714

2 Claims. (Cl. 244—103)

The present invention relates to aircraft having castering or steerable dual landing wheels.

In certain aircraft having castering dual wheels, particularly aircraft having tricycle type landing gear with a castering dual wheel assembly forward of the aircraft center of gravity, it has been found that when such dual wheels are keyed together for rotation as a unit steering during ground operation is difficult by reason of the tendency of the dual wheels to track in a straight line. On the other hand it has been observed that when the dual wheels are mounted for free relative rotation there is at times a tendency for them to shimmy or to oscillate about the caster axis with the result that it is difficult to control the aircraft, particularly when the condition arises at high speeds.

The present invention provides a simple and lightweight means for damping such oscillations of the dual wheels about the caster axis while at the same time enabling them to rotate relatively so that excessive steering loads are avoided. According to the invention one of the dual wheels may be keyed to an axle that is mounted on the airplane for free rotation and also for steering or castering movement, but the other one of the dual wheels is mounted for frictionally resisted rotation upon the axle. The resistance of the friction means is such as to constrain the wheels against relative rotation sufficiently to damp oscillations of the wheel and axle assembly about the caster axis, thereby improving the stability of the airplane during take-off and landing runs. At the same time the resistance of the friction means is sufficiently light that the wheels can rotate relatively to enable steering the airplane with normal control pressures during taxiing operations.

The foregoing and other objects and advantages of the invention will become apparent from the following description of the typical embodiment shown in the accompanying drawings, wherein.

Figure 1:
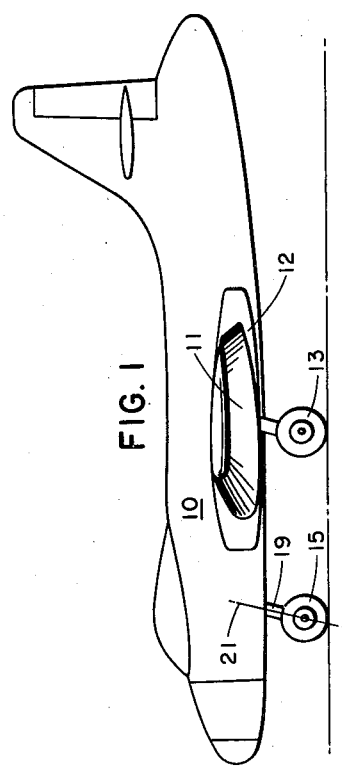
Figure 1 is a side elevation of an airplane of one type to which the invention may be advantageously applied.

As shown in Figure 1 the airplane, comprising fuselage 10, wing 11 and engine nacelle 12, has a tricycle type landing gear including a pair of dual landing wheels 13 aft of the airplane center of gravity and a dual nose wheel forward of the center of gravity. The wheels and the supporting struts therefor are shown only in their projected or landing positions but it will be understood that they may be retracted into the airplane by suitable mechanism, not shown. Independently operated brakes, also not shown, are provided on the wheels 13 to enable the usual braking action and steering of the airplane upon the ground.

Figure 2:
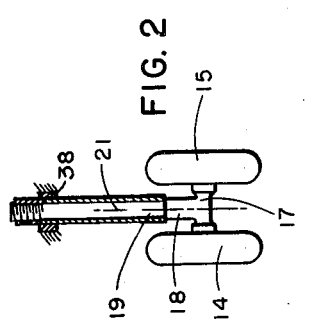
Figure 2 is a front elevation of the castering dual nose wheel assembly of the airplane; and, Figure 3 is a sectional view taken through the hub of the wheel assembly.
Figure 3:
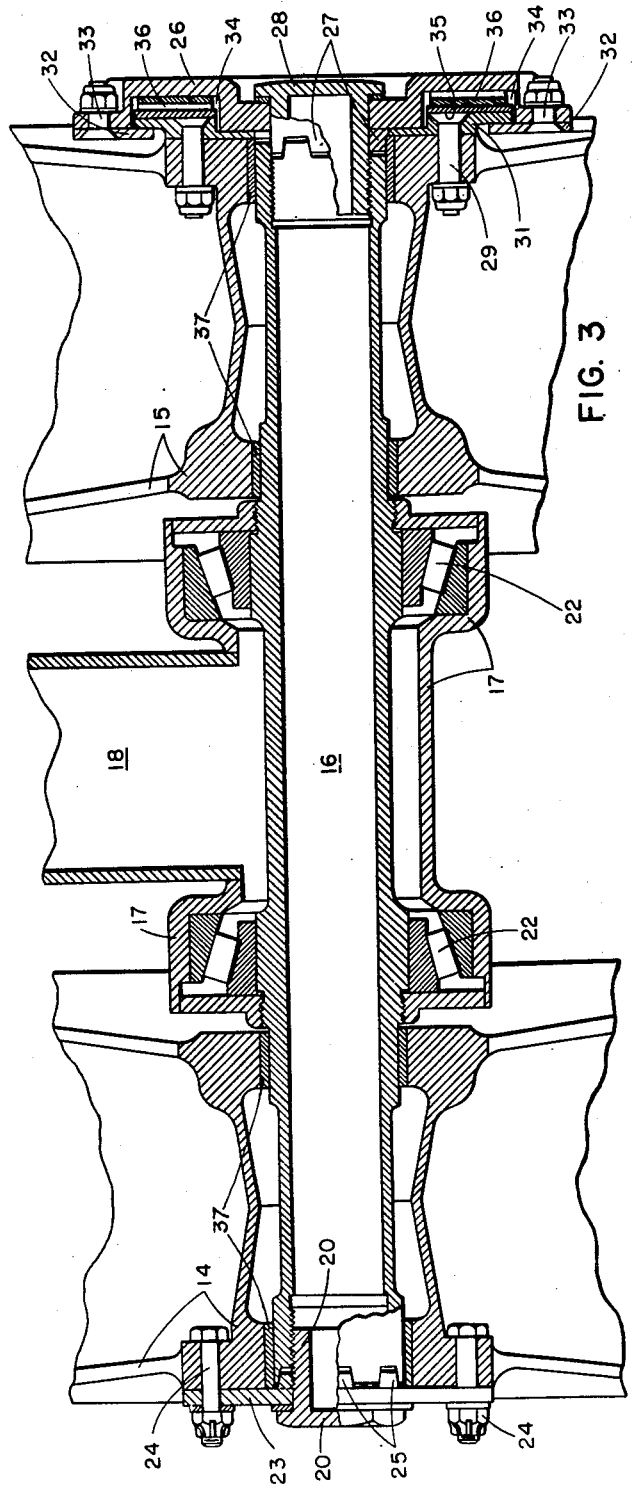

The dual nose wheel assembly comprises left and right wheels 14 and 15 mounted on a tubular axle 16 on opposite sides of an axle mounting 17. The latter is formed on the bottom of an inner section 18 of the nose wheel supporting strut, the outer section of the strut, designated 19, being connected to the airframe schematically indicated at 38. The inner strut section, as shown in simplified form in Figure 2 is rotatable in the outer strut section about a substantially upright caster axis 21 which, as shown in Figure 1, preferably intersects the ground level somewhat forward of the center of contact with the ground of wheels 14 and 15 so that the nose wheels will caster properly.

The axle 16 is supported in mounting 17 on tapered roller bearings 22 that are arranged to bear both radial and thrust loads. Both wheels are mounted on the axle by means of sleeve type bearings 37 pressed into the wheel hubs. The left wheel 14 is keyed to the axle by a retainer 23 which is connected to the wheel by fasteners 24 and has key projections 25 which seat in complementary keyways formed in the end of the axle. The retainer 23 is secured against axial displacement by headed fastener 20 which is screw threaded into the end of the axle.

The right wheel 15 is retained on the axle by a generally similar arrangement including a retainer 26 having key projections 27 seating in keyways formed in the end of the axle and a headed fastener 28 for the retainer screw threaded into the axle. Retainer 26, although holding the wheel 14 against axial displacement does not prevent the wheel from rotating upon the axle. The wheel has secured thereto, by fasteners 29 in the illustrated embodiment, an annular friction element 31 which extends radially beyond the periphery of the hub of the wheel to provide an inner annular face that is engageable with the outer face of a ring 32. The latter is affixed to the retainer 26 by fasteners shown at 33.

The retainer 26 has on its inner face an annular recess 34 which receives the outer portion of friction element 31 and which also contains an annular friction shoe 35 and a crimped spring ring or washer 36. The latter serves to urge the shoe 35 axially with respect to the retainer 26 into frictional engagement with the outer face of element 31 and also to urge ring 32 into frictional engagement with the inner face of element 31.

The frictional constraint to relative rotation of wheel 15 and the assembly comprising axle 16 and wheel 14, provided by the means just described, should be of a value sufficient to dampen oscillations of the wheel and axle assembly about axis 21. Such oscillations may result, particularly at relatively high speeds as during the landing and takeoff runs, from various factors, such for example as a slight dynamic unbalance of the wheel and axle assembly. If not dampened such oscillations may increase in magnitude sufficiently to endanger the aircraft structure and to cause loss of control of the aircraft at high speeds. However the frictional constraint should be much less than that required to cause the wheels to slide during turns in normal taxiing operations, and preferably is so light as to not increase appreciably the braking effort applied to wheels 13 for steering the aircraft.

The arrangement described herein is an expedient means for providing the desired frictional constraint between wheels 14 and 15, for it will be noted that the axle itself may be symmetrical and the wheels identical; the friction element 31 may be bolted to wheel 15 in the same relation that retainer 23 is bolted to wheel 14. Furthermore the several parts of the friction device may be removed and replaced without removing either of the dual wheels. However it will be understood that various changes may be made in the structure and arrangement of the parts, and also that the invention may be applied to various types of castering and steerable wheels other than nose wheels, for example tail wheels, without departing from the spirit of the invention or from the scope of the appended claims.

We claim as our invention:

1. In a castering dual landing wheel assembly for aircraft an axle mounting having means for rotatably securing it to the aircraft with its axis of rotation disposed substantially vertically, said axis of rotation constituting the axis of caster of said assembly, an axle journaled for rotation in said mounting, and dual landing wheels mounted on said axle on opposite sides of said mounting, the combination therewith of a first retaining member secured in keyed relation to one end of said axle and secured in abutting relation to the outer face of one wheel for fixing the latter to the axle, a friction element secured to the outer face of the other wheel, a second retaining member secured in keyed relation to the opposite end of said axle, a ring secured to said second retaining member and having frictional engagement with the inner face of said friction element, said second retaining member having an annular recess adjacent the outer face of said friction element, an annular friction shoe disposed in said recess for frictional engagement with said friction element, and resilient means in said recess for urging said shoe into such frictional engagement and simultaneously urging said ring into said frictional engagement with the inner face of said flange, whereby said wheels are frictionally constrained against relative rotation to damp oscillations of the wheel and axle and wheel mounting about said caster axis, the wheels being relatively rotatable against said frictional constraint while the airplane is being turned during ground operation.

2. In a castering dual landing wheel assembly for aircraft; an axle mounting having means for rotatably supporting it on said aircraft with its axis of rotation arranged substantially vertically, said axis of rotation constituting the axis of caster of said assembly; an axle journalled for rotation in said mounting; a pair of wheels mounted on said axle, one on each side of the mounting; a retainer plate rigidly secured to each outer end of said axle, only one of said plates being also rigidly secured to one of said wheels; a first friction element rigidly secured to the other wheel; a second friction element rigidly secured to the other retainer plate in opposing relationship to said first friction element; and means resiliently urging said friction elements into frictional engagement to thereby provide a predetermined degree of frictional resistance to rotation of said other wheel relative to said axle.

CHARLES F. ZIMMERMAN.
ROBERT E. KIBELE.

REFERENCES CITED

The following references are of record in the file of this patent:

UNITED STATES PATENTS

| Number | Name | Date |
| --- | --- | --- |
| 1,451,267 | Masury | Apr. 10, 1923 |
| 2,052,524 | Baker | Aug. 25, 1936 |
| 2,401,364 | Mercier | June 4, 1946 |
| 2,460,387 | Hunter | Feb. 1, 1949 |

FOREIGN PATENTS

| Number | Country | Date |
| --- | --- | --- |
| 535,038 | Great Britain | Mar. 26, 1941 |
| 601,584 | Great Britain | May 10, 1948 |